March 28, 1939.   R. R. SEARLES   2,152,444
SEAL BEARING
Filed Nov. 5, 1936

INVENTOR
RAYMOND R. SEARLES
BY
ATTORNEYS

Patented Mar. 28, 1939

2,152,444

UNITED STATES PATENT OFFICE 2,152,444

SEAL BEARING

Raymond R. Searles, New Britain, Conn., assignor to The Fafnir Bearing Company, New Britain, Conn., a corporation of Connecticut Application November 5, 1936, Serial No. 109,209

2 Claims. (Cl. 308—187.2)

My invention relates to a seal bearing. Bearing seals have heretofore been proposed and used in anti-friction bearings involving the forcing in or crimping of a seal plate in a groove or within the bore of an outer ring. A seal plate formed of metal, if it is to provide a relatively tight or leak-proof joint, must be assembled with its bearing ring with considerable force and there is great danger of distortion of the outer ring. An anti-friction bearing with a distorted outer ring soon deteriorates and fails.

It is an object of my invention to provide an anti-friction bearing with an effective seal against the loss of lubricant and against the ingress of foreign matter, which may be readily applied to provide a relatively tight joint, and in which there is no danger of distortion of the bearing ring.

It is a further object to provide a seal bearing having seal parts formed of metallic and non-metallic materials so that should the seal parts accidentally engage each other, there will be no objectionable metallic noises.

Other objects and features of invention will hereinafter be pointed out or will become apparent to those skilled in the art.

In the drawing which shows, for illustrative purposes only, a preferred form of the invention—

Figure 1:
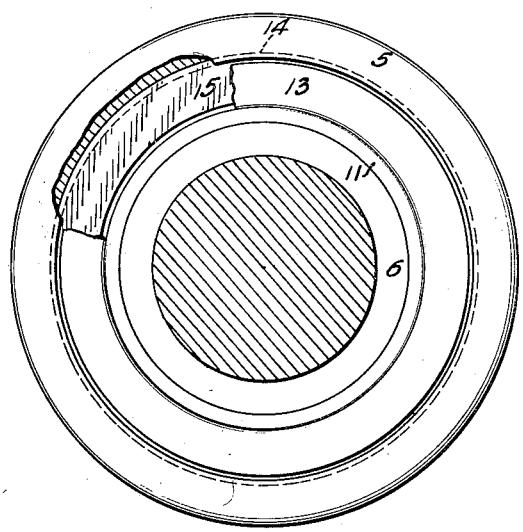
Fig. 1 is an axial view in elevation of a bearing illustrating features of the invention, parts being broken away.
Figure 2:
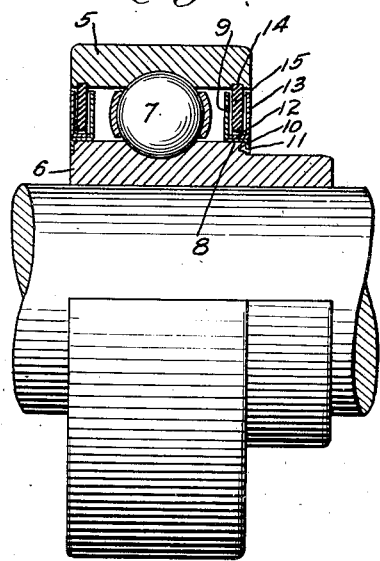
Fig. 2 is an edge view in quarter section of the seal bearing shown in Fig. 1.

In said drawing, the bearing comprises an outer bearing ring 5, an inner bearing ring 6, said rings having opposed raceways or anti-friction bearing members such as balls 7. The bearing is of the unit handling type wherein the balls themselves maintain the rings in proper relative position. A seal is provided at each side of the bearing, but since such seals may be and preferably are duplicates of each other, a description of one will apply also to the other.

One of the rings (in this case the inner ring) carries a pair of spaced apart seal plates of sheet metal, while the other bearing (in this case the outer) carries a relatively heavy, non-metallic, yieldable seal plate fitting between the first seal plates and in sealing proximity thereto. My improved construction includes a sheet metal short sleeve member 8 forced over and tightly fitting upon the outer surface of the inner ring 6. At the inner edge of the sleeve 8 is an integral radially outwardly extending seal plate or flange 9 which reaches almost to the bore of the outer ring. The edge of the bearing ring 6 adjacent the opposite edge of the sleeve 8 is turned down or rabbeted, as indicated at 10, and the sleeve 8 has an integral radially inwardly directed flange 11 to engage the radial surface formed by the turned down end of the bearing ring and thus serves to definitely limit the inward movement of the sleeve 8 on the inner ring. Extending over the sleeve 8 and tightly fitting the same is a second sleeve 12, the inner edge of which may abut the seal plate 9 and at the outer edge of which there is a radially outwardly extending seal plate 13 corresponding to the seal plate 9 and extending almost to the bore of the outer ring. Within the bore of the outer ring between the planes of the plates 9–13, there is a circumferentially extending groove 14 to receive a seal plate 15 of very substantial proportions and comprising an annular seal member formed of non-metallic yielding material, such as fiber, synthetic rubber, or like material preferably of a relatively impervious character, and of a character not to be injured by grease. The seal plate 15 extends between the plates 9–13 and in sealing proximity thereto and to the sleeve 12. The seal plate 15 of non-metallic material is preferably circumferentially continuous but due to its relative yieldability it may be forced into the groove without substantial injury thereto.

It will be seen that a seal of the character disclosed will effectively prevent loss of lubricant and ingress of foreign matter to the bearing. Furthermore, should either of the metallic seal plates be engaged by the non-metallic seal plate 15 either through faulty assembly or for any other reason, there will be no metallic noises produced such as would be produced were all of the seal plates of metal. Furthermore, the seal plate 15 being of relatively yielding material would be quite likely if forced by its contact with one of the metal seal plates to find its proper place out of contact with the seal plate, and even though the non-metallic seal plate and the metallic seal plate should rotate relatively to each other during operation of the bearing, wear will be but slight and the seal will remain effective. It is to be noted particularly that even though the non-metallic seal plate 15 be of very substantial proportions, that is, have a relatively wide bearing surface on the outer ring so as to assure an adequate seat and its proper position between the metal seal plates, the seal plate 15 being of relatively yielding material will not distort the outer ring 5 and the original accuracy of the ball bearing will therefore not be impaired by the application of the seal. It is also to be noted that the non-metallic seal plate 15 will, because of its relative yieldability make a more nearly leakproof joint than would a metal seal plate in the same location and functioning in the same way.

A substantial advantage of the method of locating or limiting the inward movement of the seal plate 9 and its sleeve 8 by providing a radially inwardly directed flange 11 to abut against a radial surface on the inner ring is that the grinding operations would be considerably facilitated; that is to say, the sleeve 8 should be forced onto and fit a ground surface and it is to be observed that the ground surface on which the sleeve 8 fits is the largest diameter of the inner ring and the latter can therefore be readily ground on a centerless grinder. If the sleeve 8 were assembled with the ring and the latter were turned down to provide a seat for such sleeve plate, it would be clear that such a surface could not be ground on a centerless grinder but would have to be ground by the much more expensive method of grinding on centers.

While the invention has been described in considerable detail and a preferred form illustrated, it is to be understood that changes may be made within the scope of the invention as defined in the appended claims.

I claim:

1. An anti-friction bearing including inner and outer bearing rings with interposed anti-friction bearing members, said inner ring on its outer surface in the space between the two rings having a pair of radially outwardly extending metallic seal plates spaced apart from each other, said outer bearing ring on its inner surface having a circumferentially extending groove facing said inner ring lying between the planes of said seal plates on said inner ring, and a circumferentially continuous relatively thick one-piece seal plate of non-metallic yieldable material seated and confined in said groove and extending between said seal plates on said inner ring and extending in sealing proximity thereto.

2. A bearing including inner and outer bearing rings with interposed anti-friction bearing members, a sheet metal sleeve member tightly fitting the outer surface of said inner bearing ring and having a radially outwardly extending seal flange thereon at its inner edge and having a radially inwardly extending flange thereon at its outer edge, said inner ring having a turned down or rabbeted portion at one edge for receiving and positioning said inwardly extending flange, a sleeve member extending along and tightly fitting said first mentioned sleeve member and provided with a radially outwardly extending seal flange spaced from said first mentioned seal flange, and a relatively thick seal member of non-metallic yielding material carried by said outer ring and extending between said seal plates on said inner ring and in sealing proximity thereto.

RAYMOND R. SEARLES.